United States Patent
Lee et al.

(10) Patent No.: US 6,842,333 B2
(45) Date of Patent: Jan. 11, 2005

(54) PORTABLE ELECTRONIC DEVICE HAVING LCD AND TOUCH SCREEN

(75) Inventors: Chang-Il Lee, Hwaseong-Gun (KR); Byeong-Yun Lee, Suwon (KR); Jong-Seo Park, Seoul (KR); Yun-Tae Kim, Pyeongtaek (KR)

(73) Assignee: LG Electronics, Inc., Seoul (KR)

( * ) Notice: Subject to any disclaimer, the term of this patent is extended or adjusted under 35 U.S.C. 154(b) by 1 day.

(21) Appl. No.: 10/237,110

(22) Filed: Sep. 9, 2002

(65) Prior Publication Data

US 2003/0048598 A1 Mar. 13, 2003

(30) Foreign Application Priority Data

| Sep. 13, 2001 | (KR) | 2001-56524 |
| Sep. 13, 2001 | (KR) | 2001-56534 |
| Oct. 5, 2001 | (KR) | 2001-61486 |
| Oct. 5, 2001 | (KR) | 2001-61491 |

(51) Int. Cl.$^7$ ............................................. G06F 1/16
(52) U.S. Cl. ...................... 361/681; 361/683; 361/687; 439/287; 312/223.2
(58) Field of Search ................................ 361/681–683, 361/687–720; 345/173, 905, 169; 348/749; 312/223.1–223.3; 439/43–48, 284, 287, 526, 947, 951, 959

(56) References Cited

U.S. PATENT DOCUMENTS

| 5,138,523 A | * | 8/1992 | Benck et al. ............... 361/687 |
| 6,091,474 A | | 7/2000 | Middleton et al. ........... 349/149 |
| 6,155,844 A | * | 12/2000 | Semmeling et al. ........... 439/65 |
| 6,181,404 B1 | * | 1/2001 | Gaffney ....................... 349/149 |
| 6,229,695 B1 | | 5/2001 | Moon .......................... 361/683 |
| 6,312,263 B1 | * | 11/2001 | Higuchi et al. ............... 439/66 |
| 6,532,152 B1 | * | 3/2003 | White et al. ................. 361/692 |
| 6,560,092 B2 | * | 5/2003 | Itou et al. .................... 361/681 |

* cited by examiner

Primary Examiner—Darren Schuberg
Assistant Examiner—Anthony Q. Edwards
(74) Attorney, Agent, or Firm—Fleshner & Kim, LLP

(57) ABSTRACT

A portable electronic device includes a main board fixed inside a case that mounts various circuit parts, an LCD module positioned at an upper side of the main board that has an LCD, an internal frame and a touch screen and an LCD module connecting unit installed for electronic connection between the main board and the LCD module when the main board and the LCD module are mutually combined or assembled. Since the main board connector is installed at the main board and the LCD connector is mounted at one side of the LCD module, when the LCD module is assembled at the main board, the LCD connector and the main board connector are mutually connected. Thus, no electric connection work is necessary, and thus, its assembling is simple and assembly process can be shortened. Further, the LCD module connecting unit can directly connect the main board and the LCD module through a support member therebetween that can include a heat sink for the main board.

32 Claims, 11 Drawing Sheets

PORTABLE ELECTRONIC DEVICE HAVING LCD AND TOUCH SCREEN

BACKGROUND OF THE INVENTION

1. Field of the Invention

The present invention relates to a portable electronic device, and more particularly, to a portable electronic device having an LCD and a touch screen and an assembly process thereof.

2. Background of the Related Art

In general, easily operated, portable home computers are progressing toward having a good computing performance and capabilities. Thus, portable electronic devices, including various operations such as an e-mail transmission and reception by writing letters on a liquid crystal screen using a touch screen method, word processor performance or an e-book reading, are available. A portable electronic device, called a Web pad or a Web tablet is one such device. As the wireless Internet communication is progressed toward a high speed, the Web pad is spotlighted for the post-PC generation together with a Personal Digital Assistant (PDAs).

In a portable electronic device such as the Web pad, a main board on which various circuit parts are mounted is fixed inside a case having a certain size. The device further includes an LCD module including an LCD and a touch screen positioned at an upper side of the main board and electrically connected to the main body to display information such as a character, a number or a picture, and a stylus pen is provided to input various information by touching the touch screen or display the information.

However, as described above, the portable electronic devices have various disadvantages. Since the currently used portable electronic device is necessarily compact, it is hard to reinforce an assembly strength between parts during assembly. Thus, the portable electronic device can be easily damaged such as by a slight impact. Further, the parts are so small that it is difficult to assembly the parts. As an assembly time period is lengthened or assembly steps are increased, a productivity is degraded.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a portable electronic device that is capable of a reduced assembly process that does not include an electric connection operation by rendering an electric connection to be made between a main board and an LCD module when the LCD module is mounted at the main board.

Another object of the present invention is to provide a portable electronic device that is capable of reducing an assembly process by rendering an electric connection among a main board, an LCD module and a touch screen when the LCD module is mounted at the main board after the LCD module and the touch screen are electrically connected.

Another object of the present invention is to provide a portable electronic device that is capable of preventing an LCD module from vibration when assembled and preventing damage of electronic parts mounted on a main board by installing a support unit for supporting the LCD module between the LCD module and the main board.

Another object of the present invention is to provide a portable electronic device that increases outward heat transfer.

Another object of the present invention is to provide a portable electronic device that is capable of preventing degradation of parts mounted on a main board by increasing outward heat transfer of heat generated from a main board.

To achieve these and other advantages in a whole or in part and in accordance with the purpose of the present invention, as embodied and broadly described herein, there is provided a portable electronic device that includes a main board installed inside a case that mounts at least one circuit part, an LCD module positioned at an upper side of the main board that includes an LCD and a touch screen, and an LCD module connector device installed between the main board and the LCD module that electronically connects the main board and the LCD module when the main board and the LCD module are mutually combined.

In one preferred portable electronic device of the present invention, an LCD connector is installed at one side of a LCD module and an LCD and a touch screen are electrically connected thereto simultaneously.

To further achieve the above objects in a whole or in part, there is provided a portable electronic device that includes a housing that includes an upper case coupled to a lower case to enclose a prescribed space there between, a main board installed inside the housing that mounts at least one circuit part, an LCD module positioned at an upper side of the main board that includes an LCD and a touch screen, an LCD module connector device installed between the main board and the LCD module that electronically connects the main board and the LCD module when the main board and the LCD module are mutually combined, wherein the LCD module connector device includes an LCD connector that extends in the downward direction from a lower surface of the LCD module, and a main board connector that extends in the upward direction from an upper surface of the main board, and wherein the LCD module connector device directly connects the LCD module to the main board.

In one preferred portable electronic device of the present invention, a support member includes a support portion protruded at a certain width upwardly from a marginal portion of a support plate to prevent vibration when an LCD module is mounted at the upper surface of the support plate.

To further achieve the above objects in a whole or in part, there is provided a portable electronic device that includes a housing that includes an upper case coupled to a lower case to enclose a prescribed space therebetween, a main board installed inside the housing that mounts at least one circuit part, an LCD module positioned at an upper side of the main board that includes an LCD and a touch screen, wherein the LCD module is coupled to the main board, a support member disposed between the LCD module and the main board, and a heat releasing unit coupled to the support member that releases heat generated from the main board.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
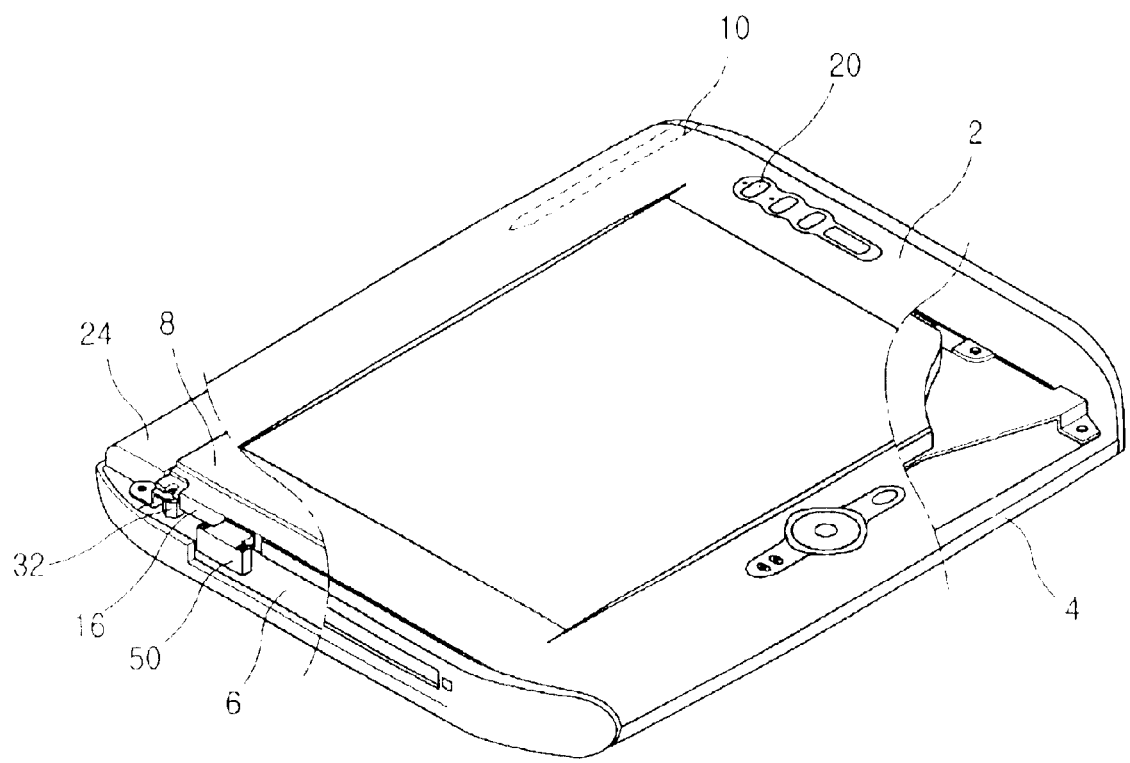
FIG. 1 is a diagram that shows a partially-cut perspective view of a portable electronic device in accordance with a preferred embodiment of the present invention.
Figure 2:
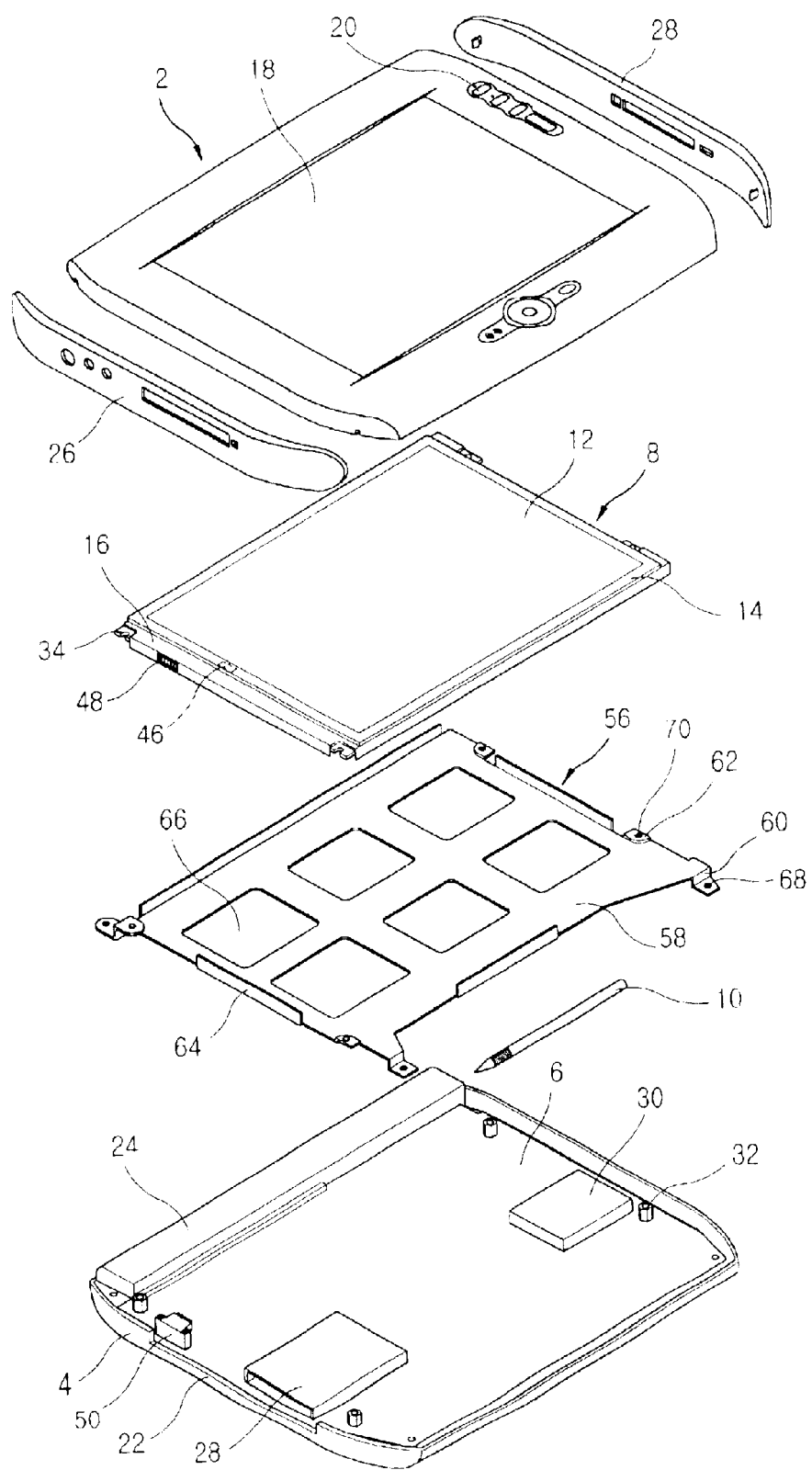
FIG. 2 is a diagram that shows an exploded perspective view of a portable electronic device in accordance with a preferred embodiment of the present invention.

FIG. 1 is a diagram that shows a partially-cut perspective view of a portable electronic device in accordance with a first preferred embodiment of the present invention. FIG. 2 is a diagram that shows an exploded perspective view of the portable electronic device in accordance with the first preferred embodiment of the present invention.

The first preferred embodiment of a portable electronic device according to the present invention includes an upper case 2 and a lower case 4 that are combined to enclose a certain space, a main board 6 fixed at the lower case 4 and mounting various circuit parts thereon, and an LCD module 8 positioned at an upper side of the main board 6 and electrically coupled to the main board 6 to display information such as a character, a number or a picture. A stylus pen 10 is for inputting or displaying various information by touching the LCD module 8.

The upper case 2 includes an exposure window 18 to expose a touch screen 12 of the LCD module 8 and mounts various buttons 20 to be manipulated by a user. The lower case 4 is combined at a lower side of the upper case 2 and preferably includes a cut-out portion 22 at both sides, into which various connectors and connection jacks are inserted, and at one side, a pen receiving box 24 is formed to receive a stylus pen 10. Left and right covers 26 and 28 are preferably engaged at both sides of the upper case 2 and the lower case 4.

The main board 6 is mounted to the bottom surface of the lower case 4 preferably using a bolt 32 with female screw. Attached to the main board 6 is a PCMCIA extension slot 29 into which a LAN card, a modem card, PC card and a memory card are selectively inserted for selection of a desired function for use, a compact flash card slot 30 for increasing a memory capacity by additionally inserting a memory card there to, and a plurality of circuit parts.

The LCD module 8 preferably includes an LCD 14 electrically coupled to the main board 6 to display various information, the touch screen 12 attached on the LCD 14 and electrically coupled to the LCD 14 to input information touched by the stylus pen 10 and an LCD frame 16. The LCD frame 16 preferably has the LCD 14 and the touch screen 12 inserted therein to support the LCD 14 and the touch screen 12 and includes a bolt engaging hole 34 at a marginal portion thereof.

Figure 3:
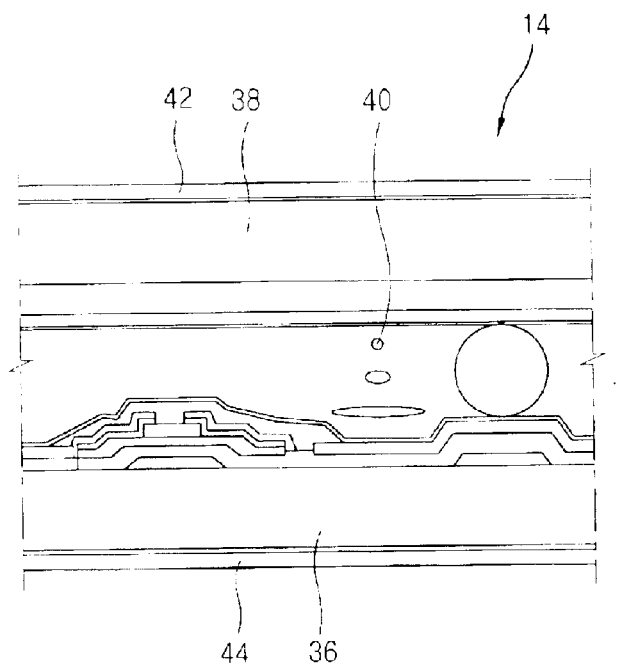
FIG. 3 is a diagram that shows a cross-sectional view of an LCD of a portable electronic device in accordance with a preferred embodiment of the present invention.

As shown in FIG. 3, the LCD 14 preferably includes a lower glass substrate 36 with TFTs and pixels aligned inside thereof, and an upper glass substrate 38 positioned at an upper side of the lower glass substrate 36 separated by a certain space. The upper glass substrate 38 preferably has common electrodes formed at a lower surface of the upper glass substrate 36 at a position corresponding to the pixels. A liquid crystal 40 is injected into the space between the upper glass substrate 38 and the lower glass substrate 36, and polarization plates 42 and 44 are attached at an outer side of the upper and lower glass substrates 38 and 36 to polarize light.

Figure 4:
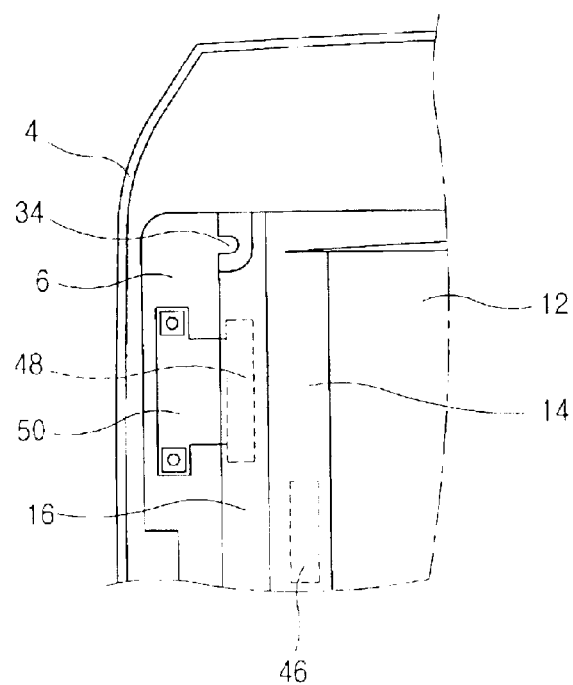
FIG. 4 is a diagram that shows a partially enlarged front view of the portable electronic device in accordance with a preferred embodiment of the present invention.

FIG. 4 is a diagram that shows a partially enlarged front view of the first preferred embodiment of the portable electronic device. As shown in FIG. 4, the touch screen 12 is attached at an upper surface of the LCD module 8, and a cable (not shown) for transmitting a signal inputted by the stylus pen 10 is coupled to the interface portion 46 installed at the LCD 14.

The touch screen 12 and the interface portion 46 of the LCD 14 can be coupled by using a connector, or the cable of the touch screen 12 can be fixed or connected to the interface portion 46 by a method of soldering or the like. Besides the above described method, other various methods can be implemented to transmit an electric signal between the touch screen 12 and the interface portion 46 installed at the LCD 14.

An LCD module connecting unit is preferably installed between the LCD module 8 and the main board 6 to concurrently make an electric connection between the main board 6 and the LCD module 8 when the main board 6 and the LCD module 8 are combined together, for example, in an assembly process.

Figure 5:
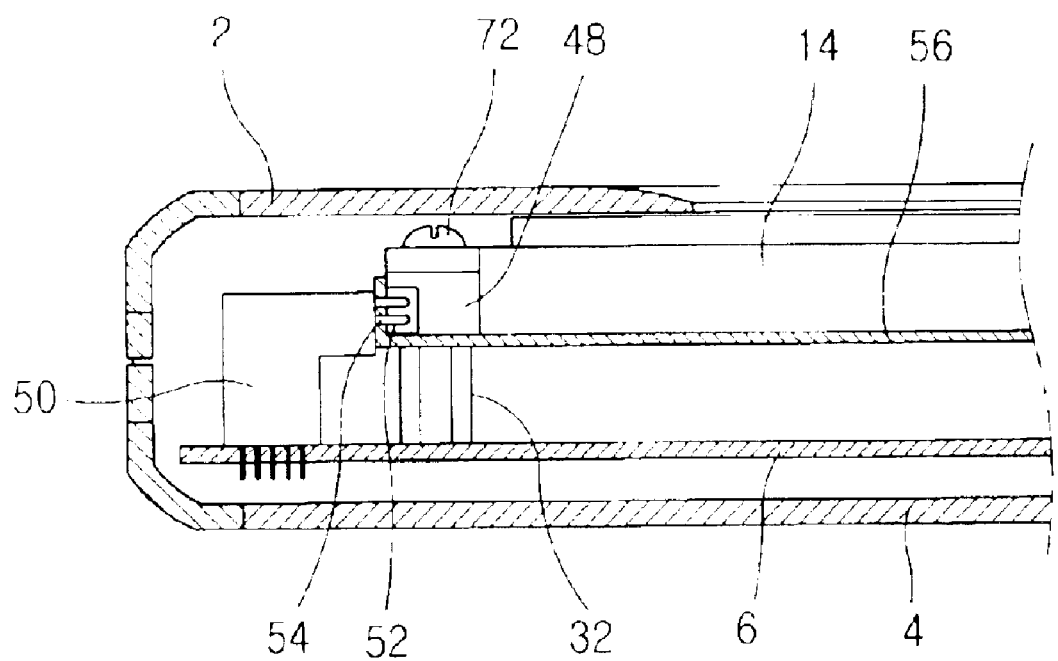
FIG. 5 is a diagram that shows a partially enlarged cross-sectional view of the portable electronic device in accordance with a preferred embodiment of the present invention.

As shown in FIG. 5, the LCD module connecting unit preferably includes an LCD connector 48 mounted at one side of the LCD frame 16 of the LCD module 8 and a main board connector 50. The main board connector 50 is preferably protruded from the upper surface of the main board 6 and coupled to the LCD connector 48 when the LCD module 8 is moved in a side direction.

The LCD connector 48 preferably includes a plurality of connector holes 52. Some of the connector holes 52 are coupled to the touch screen 12 to transmit an electric signal of the touch screen 12 to the main board 6. Others of the connector holes 52 are coupled to the LCD 14 to transmit an electric signal of the main board 6 to the LCD 14.

The main board connector 50 is preferably formed protruded upwardly from the main board 6 to a certain height to be coupled to the LCD connector 48 when the LCD module 8 is slid in the side or substantially horizontal direction. The main board connector 50 includes a plurality of connector pins 54 that slidably insert into the connector holes 52.

As shown in FIG. 2, when the LCD module 8 is engaged with the main board 6, in order to prevent a damage to various circuit parts mounted on the main board 6 and increase the engagement strength of the LCD module, a support member 56 is installed between the LCD module 8 and the main board 6. The support member 56 is preferably made of an aluminum material.

Figure 6:
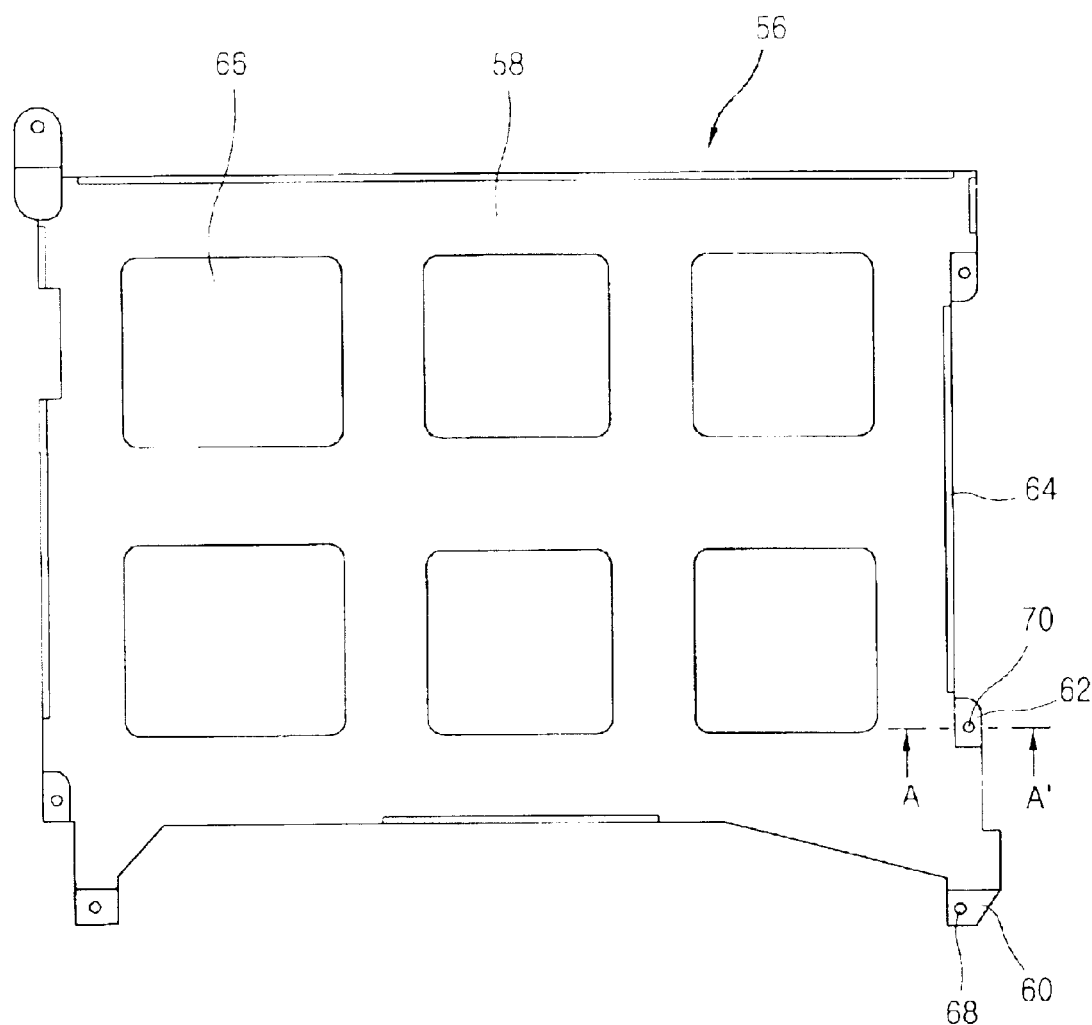
FIG. 6 is a diagram that shows a front view of a support member of the portable electronic device in accordance with a preferred embodiment of the present invention.
Figure 7:
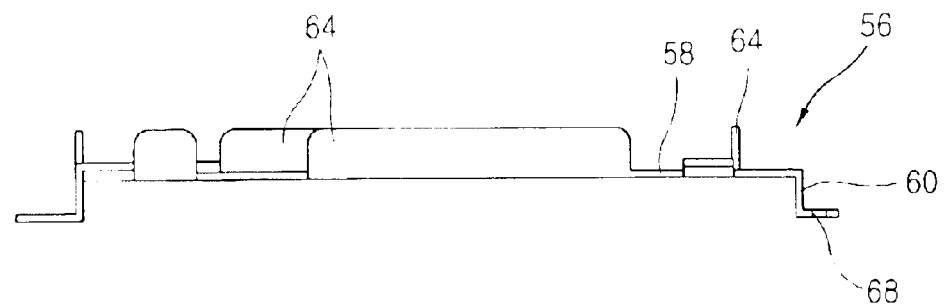
FIG. 7 is a diagram that shows a side view viewed from a left side of the portable electronic device in accordance with a preferred embodiment of the present invention.
Figure 8:
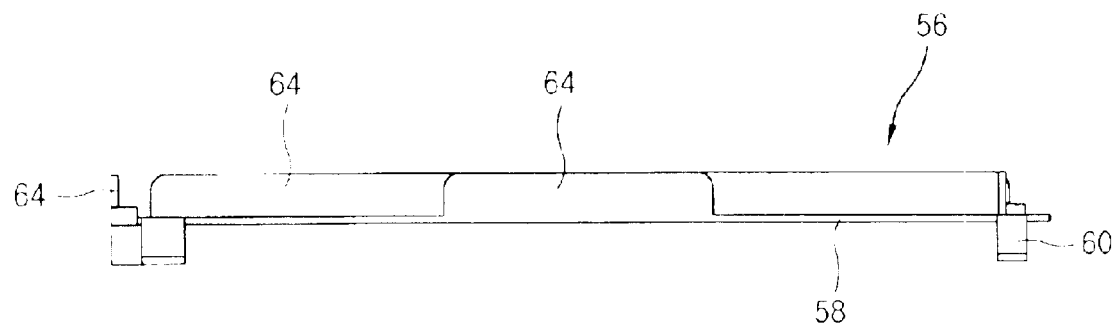
FIG. 8 is a diagram that shows a side view viewed from a front side of the portable electronic device in accordance with a preferred embodiment of the present invention.

As shown in FIGS. 6 through 8, the support member 56 includes a flat support plate 58 with a certain thickness that is disposed between the LCD module 8 and the main board 6. A first engaging unit 60 is bent downwardly from the corner of the support plate 58 and engaged with the main board 6 so that the support plate 58 can be positioned at a certain distance from the upper surface of the main board 6. A second engaging unit is 62 bent upwardly from the support plate 58 and engaged with the LCD module 8, and a support portion 64 is upwardly protruded to a certain height from the marginal portion of the support plate 58 to reduce of prevent vibration when the LCD module 8 is mounted at the upper surface of the support plate 58. A plurality of through holes 66 are preferably formed at the support plate 58 by a press work or the like to reduce the overall weight of the device.

The first engaging unit 60 is formed by bending the corner of the support plate 58 with a certain dimension downwardly and including a bolt hole 68 for a bolt engagement or the like. Using the first engaging unit 60, the support plate 58 can be positioned at a certain height from the upper surface of the main board 6 to thereby prevent various circuit parts mounted on the main board 6 from damage. The second engaging unit 62 is bent with a certain dimension upwardly from the marginal portion of the support plate 58 and includes a bolt hole 70 for being bolt-engaged or the like with the LCD module 8.

Assembly operations of a preferred embodiment of a portable electronic device according to the present invention will now be described. Assembly operations will be described with respect to the first preferred embodiment. However, the present invention is not intended to be so limited.

Figure 9:
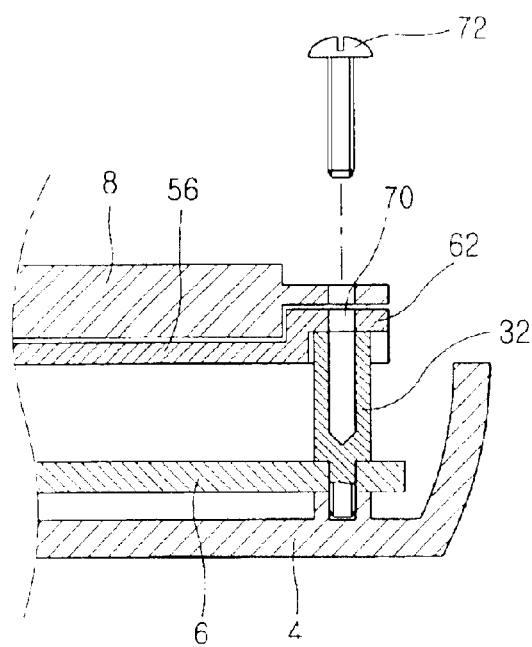
FIG. 9 is a diagram that shows a partial cross-sectional view showing an assembly structure of the portable electronic device in accordance with a preferred embodiment of the present invention.

FIG. 9 is a diagram that shows a partial sectional view of an assembly structure of the portable electronic device in accordance with the first embodiment of the present invention. As shown in FIG. 9, the main board 6 is positioned at the inner bottom surface of the lower case 4, and fixed to the lower case 2 by using the bolt 32 with female screw.

The support member 56 is positioned at the upper surface of the main board 6. The first engaging unit 60 of the support member 56 is in contact with the upper surface of the main board 6, and then the bolt or the like is combined into the bolt hole 68 formed at the first engaging unit 60, to assemble the main board 6 and the support member 56.

After the LCD module 8 is positioned at the upper surface of the support member 56, the LCD module 8 and the main board 6 are electrically coupled. When the LCD module 8 is slid in the side direction, the connector pin 54 of the main board connector 50 mounted on the main board 6 is inserted into the connector hole 52 of the LCD connector 48. Thus, the main board 6 and the LCD module 8 are electrically coupled.

Since the LCD module 8 is fixed at the LCD frame 16 in a state that the touch screen 12 is electrically coupled with the LCD 14 by the interface portion 46, when the main board connector 50 and the LCD connector 48 are coupled, the LCD 14 and the touch screen 12 are substantially simultaneously electrically coupled with the main board 6.

After the second engaging unit 62 of the support member 56 is mounted at an upper surface of the bolt 32 with female screw and the bolt engaging hole 34 of the LCD module 8 is positioned at the upper surface of the second engaging unit 62 of the support member 56, the bolt 72 is engaged. Thus, the LCD module 8 is preferably completely assembled.

Thereafter, the upper case 2 is assembled to the upper surface of the lower case 4, and then the left and right covers 26 and 28 are assembled to the both sides of the upper case 2 and the lower case 4. Thus, the portable electronic device is preferably completely assembled.

Figure 10:
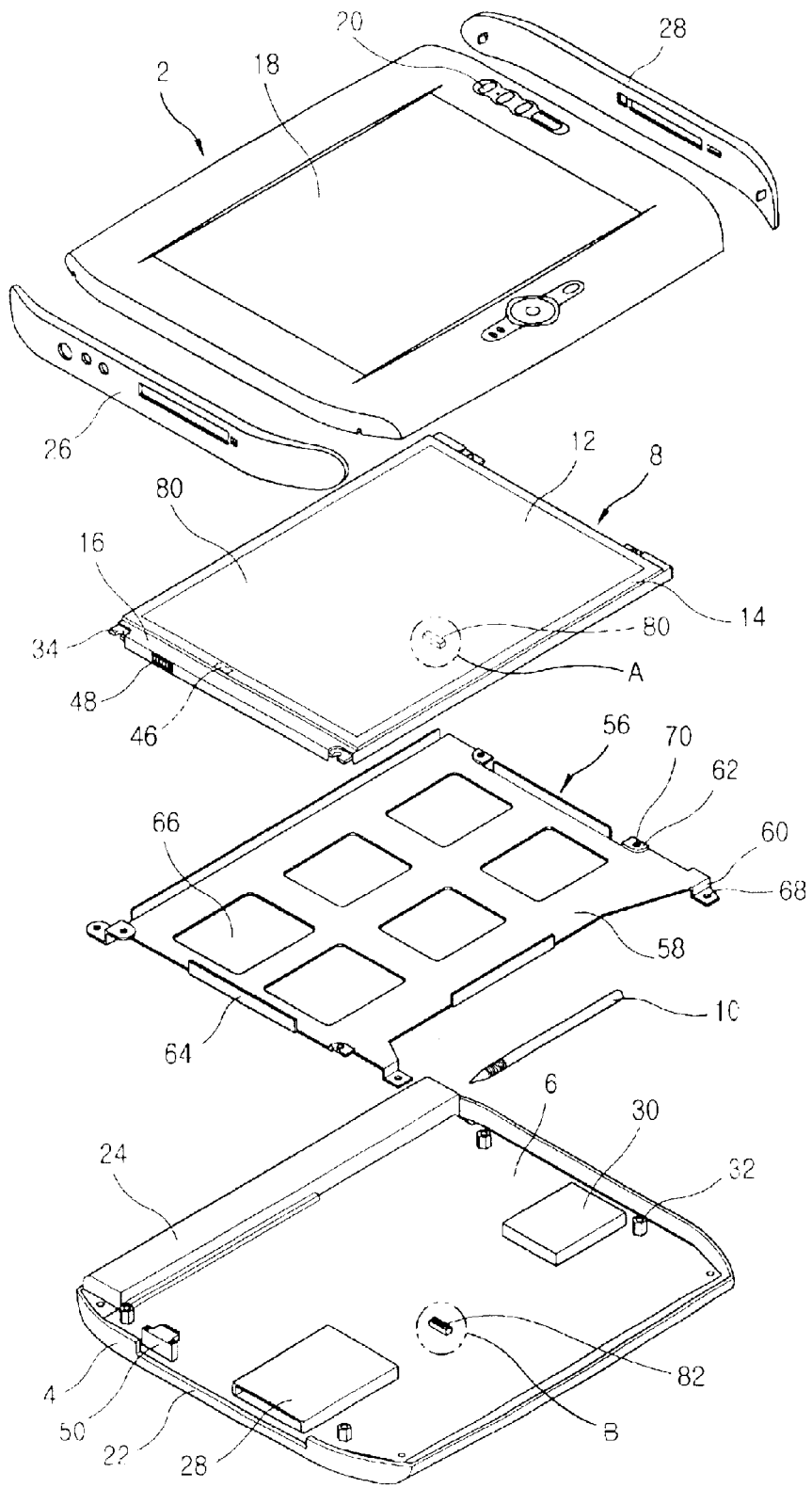
FIG. 10 is a diagram that shows an exploded perspective view of the portable electronic device in accordance with another preferred embodiment of the present invention.
Figure 11:
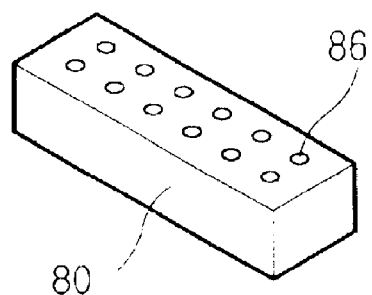
FIG. 11 is a diagram that shows an enlarged view of the portion 'A' of FIG. 10.
Figure 12:
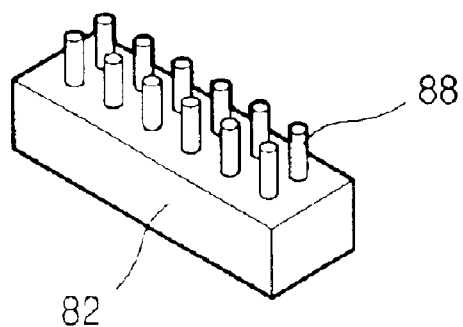
FIG. 12 is a diagram that shows an enlarged view of the portion 'B' of FIG. 10.

FIG. 10 is a diagram that shows an exploded perspective view of a second preferred embodiment of a portable electronic device in accordance with the present invention. FIG. 11 is an enlarged view of the portion 'A' of FIG. 10 and FIG. 12 is an enlarged view of the portion 'B' of FIG. 10 in accordance with the second preferred embodiment of the present invention.

A portable electronic device in accordance with the second embodiment of the present invention has a similar structure with the portable electronic device of the first preferred embodiment according to the present invention described above with an exception for an LCD module connecting unit. Accordingly, a detailed description of the similar elements will be omitted here.

As shown in FIG. 10, an LCD module connecting unit of the portable electronic device in accordance with the second embodiment of the present invention includes an LCD connector 80 mounted at one side of the lower surface of the LCD module 8 and a main board connector 82. The main board connector 82 is mounted at one corresponding side of the upper surface of the main board 6 and coupled to the LCD connector 80.

As shown in FIG. 11, the LCD connector 80 is protruded at a certain dimension or size downwardly from a prescribed position on the lower surface of the LCD module 8. A plurality of connector holes 86 are formed at the protruded front side (e.g., bottom) of the LCD connector 80.

As shown in FIG. 12, the main board connector 82 is protruded at a certain dimension or size upwardly from a corresponding position on the upper surface of the main board 6. A plurality of connector pins 88 are formed at the upper surface of the main board connector 82 for insertion and connection to the connector holes 86. Thus, the LCD connector 80 and the main board connector 82 are slidably connected, however, the present invention is not intended to be so limited.

In assembling the LCD module connecting unit of the second preferred embodiment of the portable electronic device, the LCD module 8 is preferably mounted on the main board 6, so that the LCD connector 48 and the main board connector 82 are mutually connected and an electric connection is made therebetween.

Figure 13:
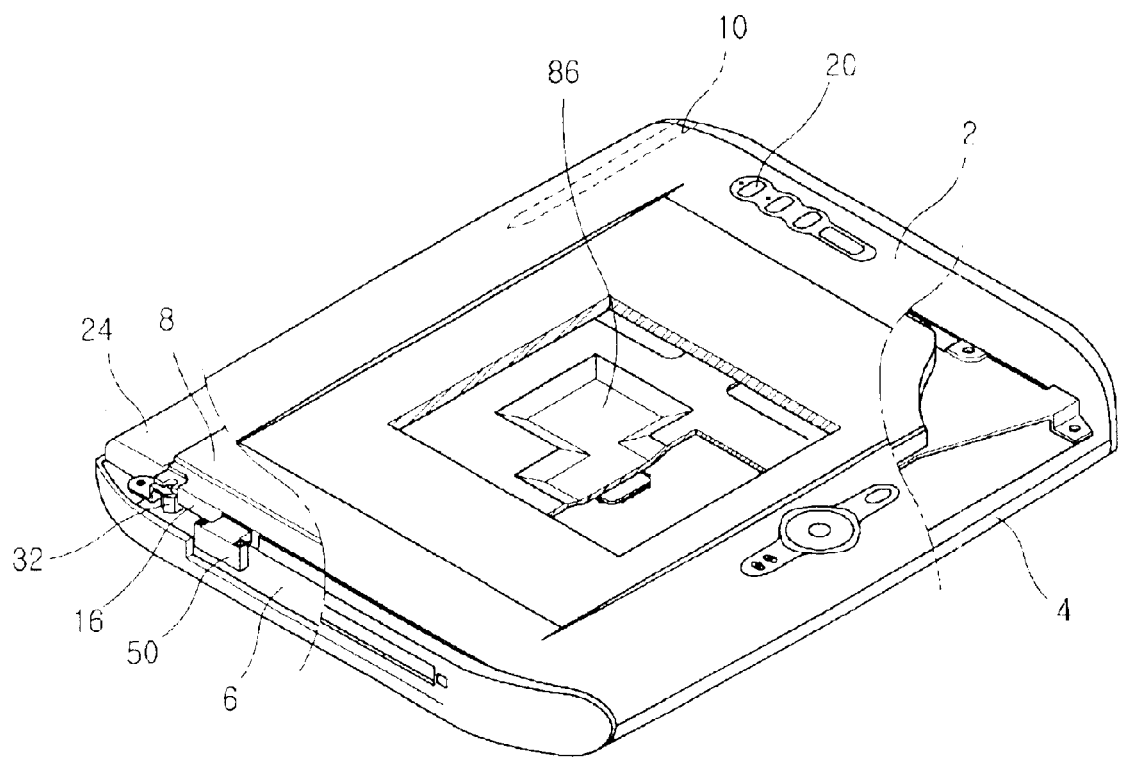
FIG. 13 is a diagram that shows a partially cut perspective view of a portable electronic device in accordance with still another preferred embodiment of the present invention.
Figure 14:
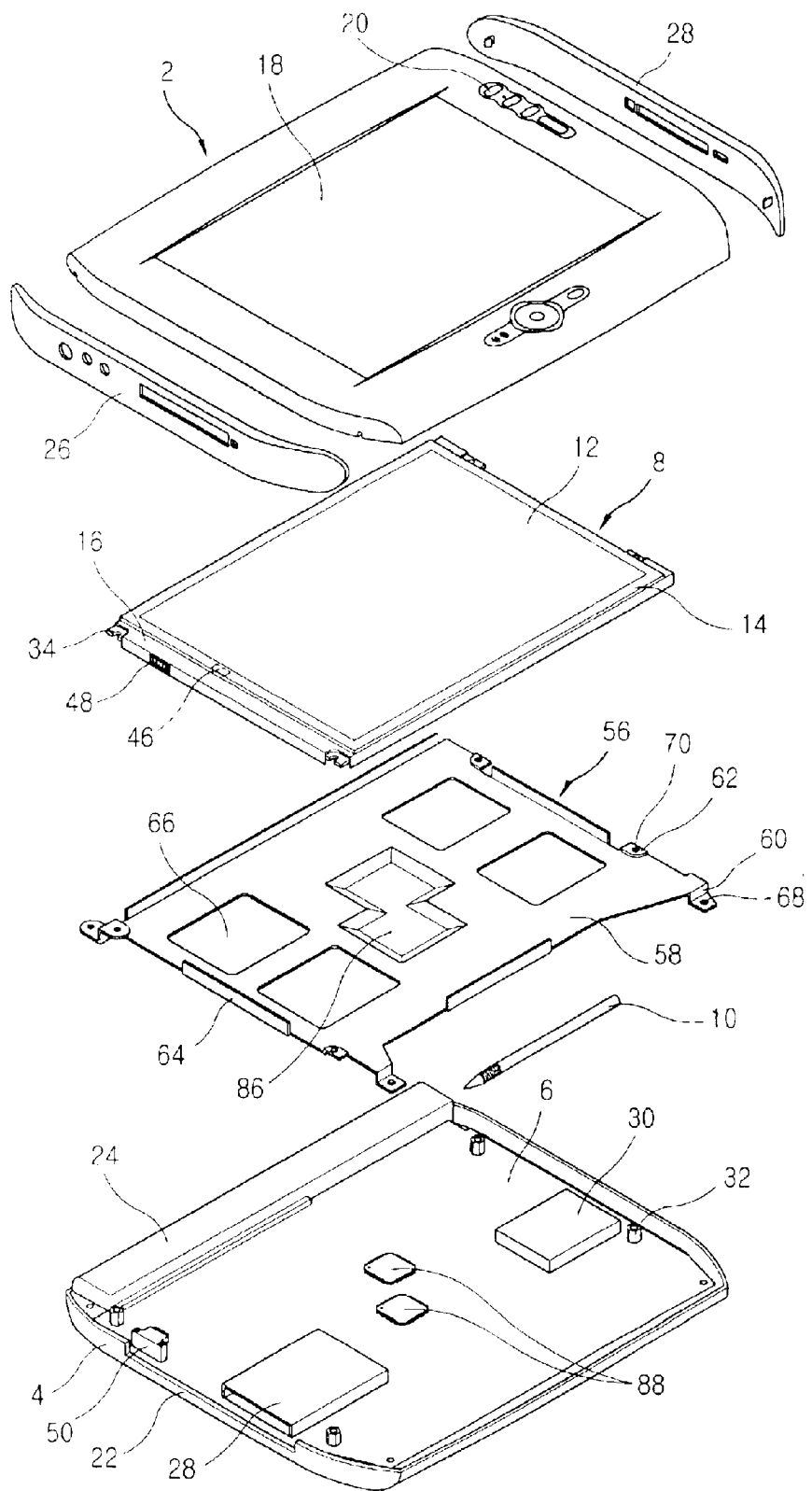
FIG. 14 is a diagram that shows an exploded perspective view of the portable electronic device in accordance with still another preferred embodiment of the present invention.

FIG. 13 is a diagram that shows a partially cut perspective view of a portable electronic device in accordance with a third preferred embodiment of the present invention. FIG. 14 is an exploded perspective view of the third preferred embodiment of the portable electronic device in accordance with the present invention.

The portable electronic device in accordance with the third preferred embodiment includes an upper case 2 and a lower case 4 that are combined to have a certain space enclosed there between, a main board 6 fixed at the lower case 2 that mounts various circuit parts, and an LCD module 8 positioned at an upper side of the main board 6 and electrically coupled to the main board 6 to display information such as a character, a number or a picture. A stylus pen 10 is for inputting or displaying various information by touching the LCD module 8. A support member 56 is preferably positioned between the LCD module 8 and the main board 6 and supports the LCD module 8 and the main board 6. A heat-releasing unit 86 is formed at one side of the support member 56 and outwardly releasing heat generated from heat generating parts such as a CPU mounted on the main board 6.

The upper and lower cases 2 and 4, the LCD module 8 and the main board 6 can be preferably similar to the portable electronic device of the first or second preferred embodiments according to the present invention. Thus, a detailed description is omitted here.

Much heat is generated from parts such as a CPU among the plurality of circuit parts mounted on the main board 6. Accordingly, in order to receive the heat generated from a heat-generating part 88, a heat-releasing unit 86 is positioned to be in contact with or sufficiently close to effectively transfer heat from the heat-generating part 88 mounted on the main board 6.

The heat-releasing unit 86 includes at least one heat-releasing portion protruded at a certain width downwardly from one side of the support member 56 by a bending method, or the like, and preferably being in contact with the upper surface of the at least one heat-generating part 88 mounted on the main board 6.

The heat-releasing portion is preferably made of aluminum, which is the same material as that of the support member 56. A portion of the support member 56 is downwardly bent by a bending method or the like to be in contact with the upper surface of the heat-generating part 88 mounted on the main board 6 so that heat generated from the heat-generating part 88 is transmitted to the entire support member 56 through the heat-releasing portion of the heat releasing unit 86 and released.

The heat-releasing portion can be formed in various forms, which can differ depending on the form of the heat-generating part 88 mounted on the main board 6. Besides the heat-releasing portion being integrally molded or formed in a bending process with the support member 56 as described above, the heat-releasing unit 86 may include a heat-releasing member (not shown) made of a material having an excellent heat conductivity that is coupled to the lower side of the support member 56.

The heat-releasing unit 86 constructed is preferably formed integrally with the support member 56 or combined with the support member 56 to be in contact with the support member 56 and also to be in contact with the upper surface of the heat-generating part 88 mounted on the main board 6. Thus, when heat generated from the heat-generating part 88 is transmitted to the entire support member 56, the support member 56 serves as a heat sink to release heat outwardly.

Figure 15:
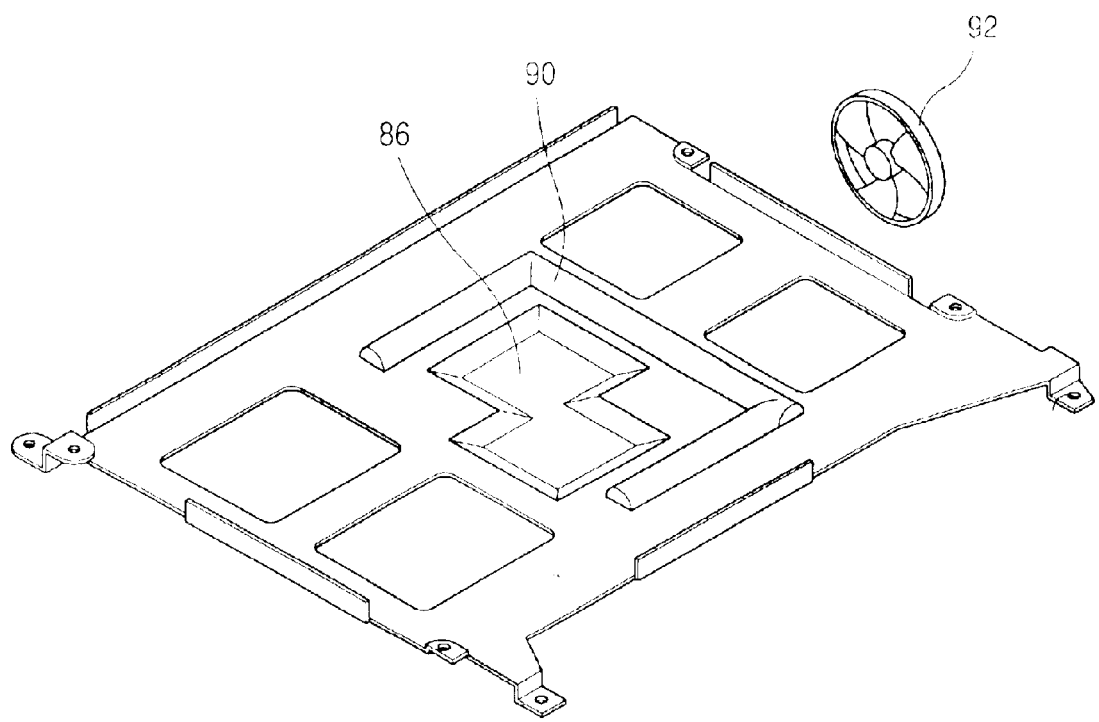
FIG. 15 is a diagram that shows a perspective view showing a heat-releasing unit of a portable electronic device in accordance with still yet another preferred embodiment of the present invention.

FIG. 15 is a diagram that shows a partially cut perspective view of a heat-releasing unit of a fourth preferred embodiment of a portable electronic device in accordance with the present invention. As shown in FIG. 15, the heat-releasing unit 86 of a portable electronic device in accordance with the fourth preferred embodiment includes two heat-releasing portions protruded downwardly from one side of the support member 56 to be in contact with a chip mounted on the main board 6, a heat pipe 90 protruded at a certain dimension or size from the upper surface of the support member 56 and a blowing fan 92 preferably installed at one side of the support member 56 and blowing air toward at least the heat pipe 90 to perform a cooling operation.

In a heat-releasing device of the portable electronic device in accordance with the fourth preferred embodiment of the present invention, heat generated from a heat-generating part (not shown) mounted on a main board (not shown) is transmitted to the entire support member 56 through the heat-releasing portions of the heat-releasing unit 86 and also to the heat pipe 90. The support member 56 and the heat pipe 90 are preferably cooled by the air blown by the blowing fan 92.

As described above, preferred embodiments of a portable electronic device and methods according to the present invention have various advantages. A main board connector is installed at a main board and an LCD connector is correspondingly fixedly mounted at one side of the LCD module. When the LCD module is assembled at the main board, the LCD connector and the main board connector are mutually connected. Thus, no electric connection work is necessary, for example, for coupling and fixing a connecting ribbon, and accordingly, assembling is simple and an assembly process can be shortened.

After a touch screen and an interface portion of the LCD are electrically connected, when the LCD module is mounted on the main board, the main board, the LCD module and the touch screen are electrically connected. Thus, assembling the portable electronic device is simple, an assembly process can be shortened and costs can be reduced.

Since a support member is provided between the LCD module and the main board to support the LCD module, no vibration occurs to the LCD module in an assembling process and the electronic parts mounted on the main board can be prevented from damage.

Further, an amount of heat generated from the main board that is released can be increased so that parts mounted on the main board can be prevented from degrading or have damage reduced or presented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A portable electronic device, comprising:
  a housing that includes an upper case coupled to a lower case to enclose a prescribed space there between;
  a main board installed inside the case that mounts at least one circuit part;
  an LCD module positioned at an upper side of the main board that includes an LCD and a touch screen; and an LCD module connector device installed between the main board and the LCD module that electronically connects the main board and the LCD module when the main board and the LCD module are horizontally mutually combined, wherein the LCD module connector device includes:
- an LCD connector mounted to a side of the LCD module; and
- a main board connector mounted to an upper side of and protruding from the main board, and wherein directly engaging the LCD connector to the main board connector connects the LCD module to the main board.

2. The portable electronic device of claim 1, wherein the LCD module comprises a frame into which the LCD and the touch screen are supportedly inserted, wherein the LCD displays various information, and wherein the touch screen is attached at an upper surface of the LCD and electrically coupled to an interface portion of the LCD.

3. The portable electronic device of claim 2, wherein the touch screen and the interface portion of the LCD are coupled using a connector.

4. The portable electronic device of claim 1, wherein the LCD connector and the main board connector are slidingly engaged using a pin-receiving hole connection system.

5. The portable electronic device of claim 4, wherein the main board connector protrudes to prescribed height from the upper side of the main board to connect to the LCD connector, and wherein the LCD and the touch screen are electrically connected to the main board through the LCD connector of the LCD module.

6. The portable electronic device of claim 5, further comprising:
- a support member disposed between the main board and the LCD module to prevent a damage to the circuit parts mounted on the main board and reinforce the LCD module, wherein the support member includes,
- a support plate with a thickness disposed between the LCD module and the main board,
- a first engaging unit downwardly extended from the support plate and engaged with the main board to position the support plate at a certain distance from an upper surface of the main board, and
- a second engaging unit upwardly extended from the support plate that engages the LCD module.

7. The portable electronic device of claim 1, wherein a portion of the main board connector extends straight in the upward direction, and wherein the LCD connector and the main board connector are slidingly engaged using a pin-receiving hole connection system.

8. The portable electronic device of claim 1, further comprising a support member disposed between the main board and the LCD module, wherein the LCD module connector device passes through the support member.

9. The portable electronic device of claim 8, wherein the support member comprises:
- a support plate with a prescribed thickness between the LCD module and the main board, wherein the support plate has a plurality of through holes;
- a first engaging unit downwardly extended from the support plate and engaged with the main board to position the support plate at a spaced relationship from an upper surface of the main board; and
- a second engaging unit upwardly extended from the support plate that engages the LCD module, wherein the LCD module connector device extends through the through holes of the support plate.

10. The portable electronic device of claim 9, wherein the support member includes a support portion protruded at a certain width upwardly from a marginal portion of the support plate to prevent a vibration when the LCD module is mounted at the upper surface of the support plate.

11. The portable electronic device of claim 10, wherein the first engaging unit is in at least one corner of the support plate and includes a bolt hole for a bolt engagement, and wherein the second engaging unit extends upwardly from a marginal portion of the support plate and includes a bolt hole for bolt engagement with the LCD module.

12. The portable electronic device of claim 8, wherein the support member comprises a support plate, wherein the support plate comprises at least three lengthwise support parts that extend from an end of the support member to an opposing end of the support member, and wherein the at least three lengthwise support parts define at least two through holes in the support plate.

13. The portable electronic device of claim 12, wherein the LCD module connector device passes through one of the at least two through holes.

14. The portable electronic device of claim 8, further comprising a heat releasing unit installed at one side of the support member that releases heat generated from the main board.

15. The portable electronic device of claim 1, wherein the LCD module connector device comprises a rigid coupling, and wherein the rigid coupling supports the LCD module at a spaced relationship from the main board.

16. The portable electronic device of claim 15, wherein the rigid coupling does not extend beyond an upper surface of the LCD module and beyond an upper surface of the main board.

17. A portable electronic device, comprising:
- a housing that includes an upper case coupled to a lower case to enclose a prescribed space there between;
- a main board installed inside the housing that mounts at least one circuit part;
- an LCD module positioned at an upper side of the main board that includes an LCD and a touch screen;
- a support member disposed between the main board and the LCD module, wherein the support member includes at least three lengthwise support parts that extend from an end of the support member to an opposing end of the support member and that define at least two through holes in the support member; and
- an LCD module connector device installed between the main board and the LCD module that electronically connects the main board and the LCD module when the main board and the LCD module are mutually combined, wherein the LCD module connector device comprises,
  - a first mating LCD connector that extends from a lower surface of the LCD module, and
  - a second mating main board connector that extends from an upper surface of the main board, and wherein directly engaging the LCD connector to the main board connector couples the LCD module to the main board.

18. The portable electronic device of claim 17, wherein the main board connector extends straight in the upward direction.

19. The portable electronic device of claim 17, wherein the LCD module connector device passes through one of the at least two through holes in the support member.

20. The portable electronic device of claim 17, wherein the portable electronic device is a palm-sized computer.

21. The portable electronic device of claim 17, a heat releasing unit installed at one side of the support member that releases heat generated from the main board.

22. The portable electronic device of claim 17, wherein the LCD module connector device comprises a rigid coupling, and wherein the rigid coupling provides rigid support to position the LCD module at a spaced relationship from the main board.

23. The portable electronic device of claim 22, wherein the rigid coupling does not extend above an upper surface of the LCD module and lower than an upper surface of the main board.

24. A portable electronic device, comprising
   a housing that includes an upper case coupled to a lower case to enclose a prescribed space therebetween;
   a main board installed inside the housing that mounts at least one circuit part;
   an LCD module positioned at an upper side of the main board that includes an LCD and a touch screen, wherein the LCD module is coupled to the main board;
   a support member disposed between the LCD module and the main board, wherein the support member extends between a lower surface of the LCD module and an upper surface of the main board; and
   a heat releasing unit integrally formed in the support member that releases heat generated from the main board, wherein the heat releasing unit includes a heat sink at a lower side of the support member, and a heat pipe at an upper side of the support member.

25. The portable electronic device of claim 24, wherein the support member comprises:
   a support plate with a prescribed thickness between the LCD module and the main board, wherein the support plate has a plurality of through holes;
   a first engaging unit downwardly extended from the support plate and engaged with the main board to position the support plate at a spaced relationship from an upper surface of the main board; and
   a second engaging unit upwardly extended from the support plate that engages the LCD module.

26. The portable electronic device of claim 24, wherein the heat sink is a heat-releasing part that contacts an upper surface of at least one heat-generating part among the circuit parts mounted on the main board.

27. The portable electronic device of claim 26, wherein the heat-releasing part is bent a prescribed distance in the downward direction from the support member.

28. The portable electronic device of claim 24, wherein the heat-releasing unit further comprises a fan installed in a vicinity of the heat pipe that circulates an ambient air toward the support member and the heat pipe.

29. The portable electronic device of claim 24, further comprising an LCD module connecting unit installed between the main board and the LCD module to make an electrical connection between the main board and the LCD module when the main board and the LCD module are mutually combined.

30. The portable electronic device of claim 24, wherein the support member comprises a support plate, wherein the support plate comprises at least three lengthwise support parts that extend from an end of the support member to an opposing end of the support member, and wherein the at least three lengthwise support parts define at least two through holes in the support plate.

31. A portable electronic device, comprising:
   a housing that includes an upper case coupled to a lower case to enclose a prescribed space therebetween;
   a main board installed inside the case that mounts at least one circuit part;
   an LCD module positioned at an upper side of the main board that includes an LCD and a touch screen; and
   an LCD module connector device installed between the main board and the LCD module that electronically connects the main board and the LCD module when the main board and the LCD module are horizontally mutually combined, wherein the LCD module connector device includes:
      LCD connector means for mounting to a side of the LCD module; and
      main board connector means for mounting to an upper side of the main board, and wherein directly engaging the LCD connector means to the main board connector means connects the LCD module to the main board.

32. A portable electronic device, comprising:
   housing means that includes an upper case coupled to a lower case for enclosing a prescribed space therebetween;
   main board means installed inside the housing means for mounting at least one circuit part;
   display means positioned at an upper side of the main board means for providing an LCD and a touch screen, wherein the display means is coupled to the main board means;
   support means for maintaining a space relation between the display means and the main board means, wherein the support means extends between a lower surface of the display means and an upper surface of the main board means; and
   heat releasing means integrally formed in the support means for releasing heat generated from the main board means, wherein the heat releasing means includes heat sink means at a lower side of the support means, and heat pipe means at an upper side of the support means.

* * * * *